United States Patent [19]

Zato

[11] Patent Number: 4,677,488
[45] Date of Patent: Jun. 30, 1987

[54] VIDEO SYSTEM WITH TELEVISION RECEIVER AND TELETEXT PROCESSOR CAPABLE OF SWITCHING EXTERNAL RGB SIGNALS

[75] Inventor: Thomas J. Zato, Palatine, Ill.

[73] Assignee: Zenith Electronics Corporation, Glenview, Ill.

[21] Appl. No.: 759,550

[22] Filed: Jul. 25, 1985

[51] Int. Cl.$^4$ .............................................. H04N 5/262
[52] U.S. Cl. ..................... 358/181; 358/147; 340/721
[58] Field of Search ............ 358/21 R, 181, 147, 358/64, 81, 22, 185, 903, 102, 188; 340/721, 703, 723, 732

[56] References Cited

U.S. PATENT DOCUMENTS

| | | | |
|---|---|---|---|
| 4,020,501 | 4/1977 | Hillberger et al. | 358/64 |
| 4,218,698 | 8/1980 | Bart et al. | 358/22 |
| 4,393,404 | 7/1983 | Cox et al. | 358/147 |
| 4,471,377 | 9/1984 | Mogi et al. | 358/22 |
| 4,488,179 | 12/1984 | Kruger et al. | 358/181 |
| 4,507,683 | 3/1985 | Griesshaber | 358/181 X |
| 4,575,259 | 3/1986 | Griepentrog et al. | 358/181 |
| 4,600,918 | 7/1976 | Belisomi et al. | 340/721 X |

*Primary Examiner*—James J. Groody
*Assistant Examiner*—Victor R. Kostah

[57] ABSTRACT

A video system includes a TV receiver, a TTX processor, and a microprocessor control for controlling the functions thereof. The TTX processor includes an RGB switch unit supplied with RGB signals from a shift register in the TTX processor and from an external source of RGB signals. A video coder unit includes RGB switch means for selectively supplying RGB signals from the TTX processor and from the TV receiver and a switch for selectively coupling a timing signal from the TV receiver and the external source. The RGB switch unit in the TTX processor has a TTX address and all switching is controlled by the microprocess.

5 Claims, 2 Drawing Figures

VIDEO SYSTEM WITH TELEVISION RECEIVER AND TELETEXT PROCESSOR CAPABLE OF SWITCHING EXTERNAL RGB SIGNALS

CROSS REFERENCE TO RELATED PATENT APPLICATIONS

This application is related to application Ser. No. 718,572 entitled "Television Receiver Having Teletext Processor With ROM For With On-Screen Display Message", in the names of G. Jones, P. Skerlos and T. Zato filed 4/1/85 and assigned to Zenith Electronics Corporation, which application is hereby incorporated by reference.

BACKGROUND OF THE INVENTION AND PRIOR ART

This invention relates in general to video systems and, in particular, to video systems including a television (TV) receiver, a teletext (TTX) processor and an external source of red, blue and green (RGB) color signals.

Modern television receivers are increasingly being constructed with microprocessor controlled functions. A modern video system may include a TV receiver, a video cassette recorder (VCR) and a TTX processor; may be able to process signals from a number of RF and baseband input sources; and may also be capable of processing RGB signals from an external source such as a personal computer. Source selection, tuning and control of all functions of the TV receiver, VCR and TTX processor may all be controlled from a keyboard located on a central control unit. The system may also be controlled from a remote location over a wireless link.

Many of the controls and circuit functions of the TV receiver may be "digitized" to enable appropriate data to be rapidly processed and transferred back and forth along two-way communication links or buses under control of one or more microprocessors. As such systems become more complex, the data transfer and switching requirements and the burden on the microprocessors increase, especially that on the central or control microprocessor. If the burden becomes excessive, it can complicate the software and increase the system processing time. Further, many of the functional elements in the video system are individually fabricated as standard integrated circuit chips and it is often difficult (and costly) to add to or change existing features or functions on the chip.

In the video system described in the copending application referred to above, the control microprocessor is relieved of a portion of the task of generating on-screen displays by adding a read only memory (ROM) to the TTX processor for those displays. When required, the control microprocessor addresses the TTX ROM for loading the selected, encoded display data into the TTX display memory and the on-screen display is then generated by the TTX processor. Thus, the unused capacity of the TTX processor is enlisted to relieve the control microprocessor of the burden of producing such on-screen displays.

In the present invention, the TTX processor of the video system is also used for switching the inputs of an external RGB source.

OBJECTS OF THE INVENTION

Accordingly, a principal object of the invention is to provide a novel video processing system.

Another object of the invention is to provide a video processing system including a novel switching arrangement for an external RGB source.

BRIEF DESCRIPTION OF THE DRAWINGS

These and other objects of the invention will be apparent upon reading the following description in conjunction with the drawings in which.

DESCRIPTION OF THE PREFERRED EMBODIMENT

Figure 1:
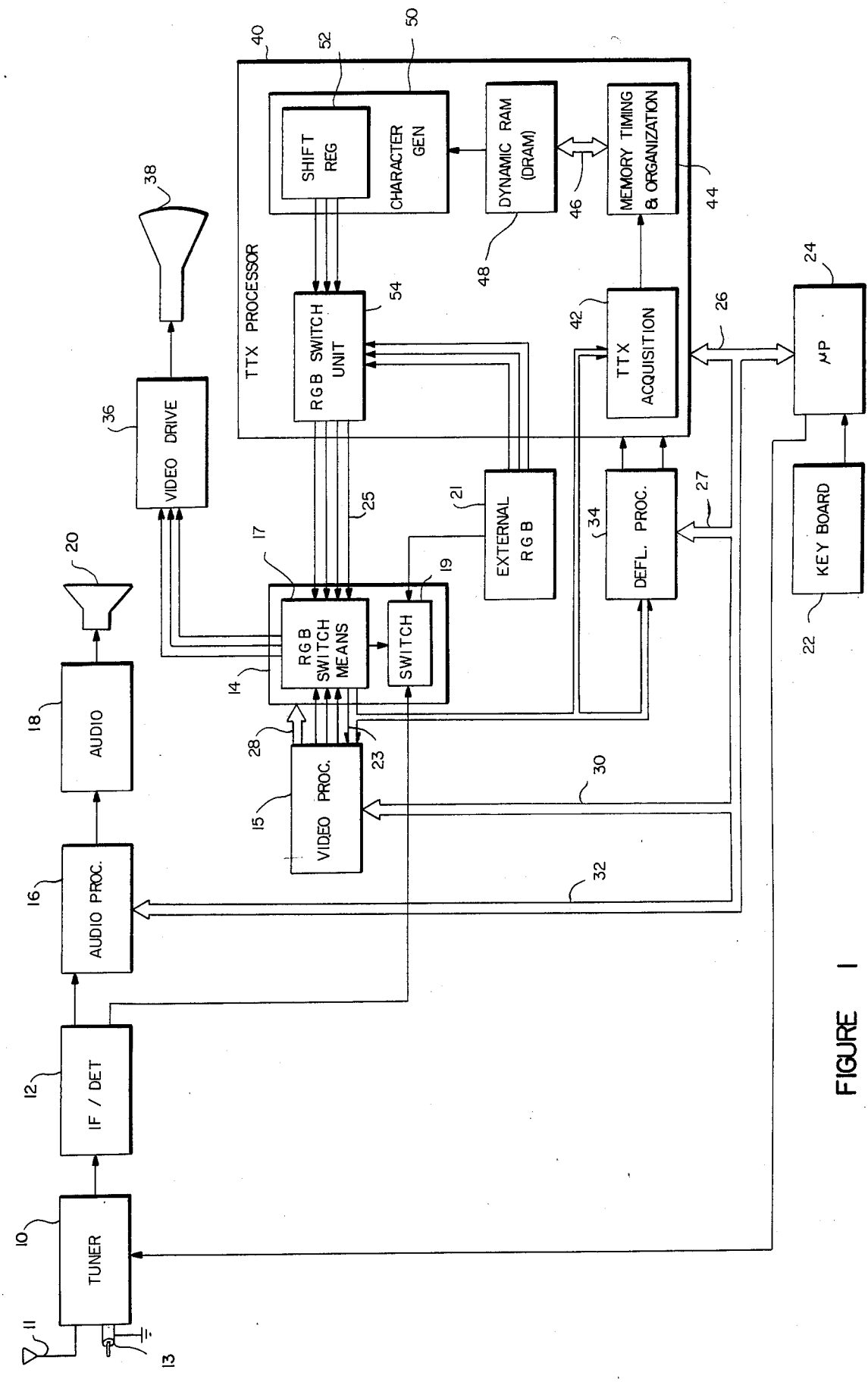
FIG. 1 is a simplified block diagram of a circuit embodying the invention.

FIG. 1 represents a video system with a microprocessor based TV receiver and TTX processor including a tuner 10, having an antenna input 11 and a cable input 13, coupled to an IF/Detector 12 which, in turn, supplies a video coder unit (VCU) 14 and an audio processor 16. Audio processor 16 supplies an audio circuit 18, the output of which drives a conventional loudspeaker 20. A viewer-operated keyboard 22 is coupled to a control microprocessor 24 that, in turn, is coupled to tuner 10 and to a two-way communication bus 26 interconnected with TTX processor 40. Communication bus 26 has a number of branches 27, 30 and 32 coupled, respectively, to a deflection processing unit 34, a video processor 15, and audio processor 16. Control information and data transmission flow in both directions over the bus such that control microprocessor 24 can "talk to" each of the units to which it is connected and such units, in turn, can "talk to" the microprocessor. A further branch 28 from video processor 15 to VCU 14 permits direct communication betweem microprocessor 24 and VCU 14.

Deflection unit 34 supplies conventional horizontal and vertical timing signals to TTX processor 40 and to other units in the video system as required. VCU 14 includes an analog to digital (A/D) converter that sends digitized video information to VPU 15 via a seven wire bus 23, suitable digital to analog (D/A) R-Y, B-Y and luminance D/A converters and an RGB matrix and switch, all included in an RGB switch means 17 that is supplied with analog RGB inputs from video processor 15 and from TTX processor 40. The switch portion of RGB switch means 17 is operated when a fast blanking signal is present on a line 25, extending from an RGB switch in unit 54 TTX processor 40 to VCU 14. Analog RGB signals are thereby directed to a video drive circuit 36 which, in turn, supplies appropriate signals to a color cathode ray tube 38. Video processor 15 supplies conventional television video information in RGB digital form and TTX processor 40 supplies TTX data in digital form. VCU 14 also includes a switch 19 for selecting appropriate timing signals as will be described below.

IF/Detector 12 supplies a conventional TV baseband video signal to a video A/D converter in RGB switch means 17, the output of which is then supplied to TTX acquisition circuit 42 in TTX processor 40, to video processor 15, and to deflection processing unit 34. The output of acquisition circuit 42 is coupled to a memory timing and organization circuit 44 which is coupled over a communication link 46 to a Dynamic Random Access Memory (DRAM) 48 that, in turn, is connected to a character generator 50. DRAM 48 will be recognized as a conventional TTX memory for storing one or more pages of TTX information in encoded form, except that it may be controlled from microprocessor 24 as explained in the copending application. The character generator includes a shift register 52 having digitized RGB outputs that are coupled to an RGB switch unit 54, the output of which is coupled to RGB switch means 17 in VCU 14. A fast blanking output 25 is also coupled to RGB switch means 17 for the purpose of switching RGB switch means 17 to receive RGB signals from TTX processor 40.

An external source 21 of RGB signals has its output coupled to RGB switch unit 54 in the TTX processor. Another lead from external source 21 is supplied to switch 19 in VCU 14. As mentioned, VCU 14 includes means for converting the analog signal information into a digital format and applying it to the deflection processor unit 34 for synchronization. Since external source 21 may have its video information separated from its timing information, a timing signal is needed to properly reconstitute the data for display. Thus, switch 19 in VCU 14 is operable under control of microprocessor 24 in order to switch the video signal to the deflection processor unit 34 for determining the horizontal and vertical timing signals that are to be used by TTX processor 40 for the displayed information. For a conventional television video signal, the timing information is included in the video signal from IF/Detector 12. For an RGB signal from external source 21, the timing information is derived from a signal from source 21. For a TTX signal, the timing is also supplied by the video signal from IF/Detector 12.

RGB switch unit 54, as well as the other switches depicted, will be understood to be electronic switches activated in response to appropriate commands from control microprocessor 24.

External source 21 is assigned a digitally coded address corresponding to TTX processor addresses. Thus, when external source 21 is selected, microprocessor 24 will issue a command on communication bus 26 that has an address recognizable by TTX processor 40. As is well known, the TTX processor includes a plurality of registers that are individually responsive to various command codes. RGB switch unit 54 is associated with one of the registers in TTX processor 40 and activated to enable RGB signals from external source 21 to be passed to the VCU 14 only when a special bit or bit code is received. For all other TTX commands, RGB switch unit 54 remains in the teletext position. Similarly, when external source 21 is selected, switch 19 in VCU 14 is also operated by microprocessor 24 to couple the timing signal from external source 21 for controlling formatting of the RGB data for the video display.

Figure 2:
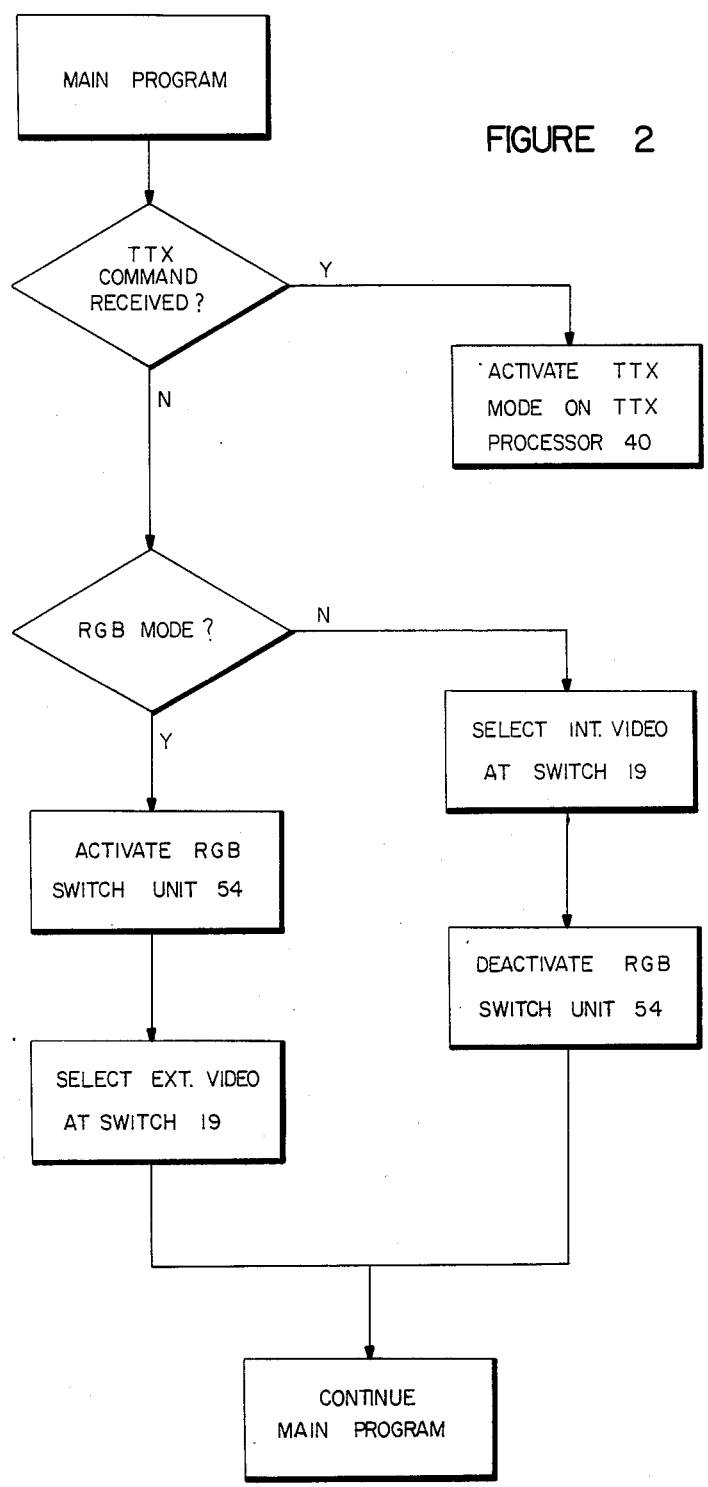
FIG. 2 is a flow chart useful in programming the control microprocessor of FIG. 1 to practice the invention.

In FIG. 2, the fow chart illustrates the programming of the microprocessor control unit for carrying out the invention. During operation, switch 19 is controlled as indicated in the flow chart. Thus in the absence of a TTX command and in a non RGB mode, internal video is selected at switch 19 and RGB switch unit 54 is deactivated. In the absence of a TTX command when in the RGB mode, RGB switch unit 54 is activated and the external video input is selected at switch 19. Of course if a TTX command is received, the TTX mode of TTX processor 40 is activated.

Thus the present invention utilizes the TTX processor capabilities for connecting RGB signals from an external source to the video system in a simple, economical manner. It is recognized that numerous changes and modifications in the described embodiment of the invention will be apparent to those skilled in the art without departing from its true spirit and scope. The invention is to be limited only as defined in the claims.

What is claimed is:

1. In combination in a video system including a television receiver, control microprocessor means, TTX processor means and an external source of RGB signals coupled to said TTX processor means;
    video means coupled to said TV receiver, to said TTX processor means and to said external source and including a switch for selectively coupling a timing signal to said video means from said TV receiver and from said external source, all under control of said control microprocessor means;
    RGB switch means in said video means for selectively supplying RGB signals from said TTX processor means and from said TV receiver for display; and
    an RGB switch unit in said TTX processor means for selectively supplying RGB signals from said external source and from said TTX processor means to said video means under control of said control microprocessor means.

2. The system of claim 1 wherein said RGB switch unit is identified by a TTX processor means address.

3. The system of claim 2 wherein said TTX processing means includes a shift register supplying digitized RGB signals to said RGB switch unit and further including;
    a video processor for supplying RGB signals from said television receiver to said video means.

4. A digitized video system including a TV receiver, a TTX processor, a microprocessor control unit and an external source of RGB signals, comprising:
    video means including RGB switch means and a switch for connecting timing signals to said RGB switch means;
    a two-way communication bus linking said microprocessor control unit to said TTX processor and enabling communication between said video means and said microprocessor control unit;
    a video processor coupled to said bus for supplying RGB signals from said TV receiver to said RGB switch means in said video means;
    an RGB switch unit in said TTX processor for selectively supplying RGB signals to said RGB switch means in said video means from said TTX processor and from said external source; and
    said switch, said RGB switch means and said RGB switch unit all being under control of said microprocessor control unit to selectively supply RGB video for display from said TV receiver, said TTX processor and said external source.

5. The system of claim 4 wherein said RGB switch unit has an address for commands from said microprocessor control unit that corresponds to an address in said TTX processor.

* * * * *